2,774,196
Patented Dec. 18, 1956

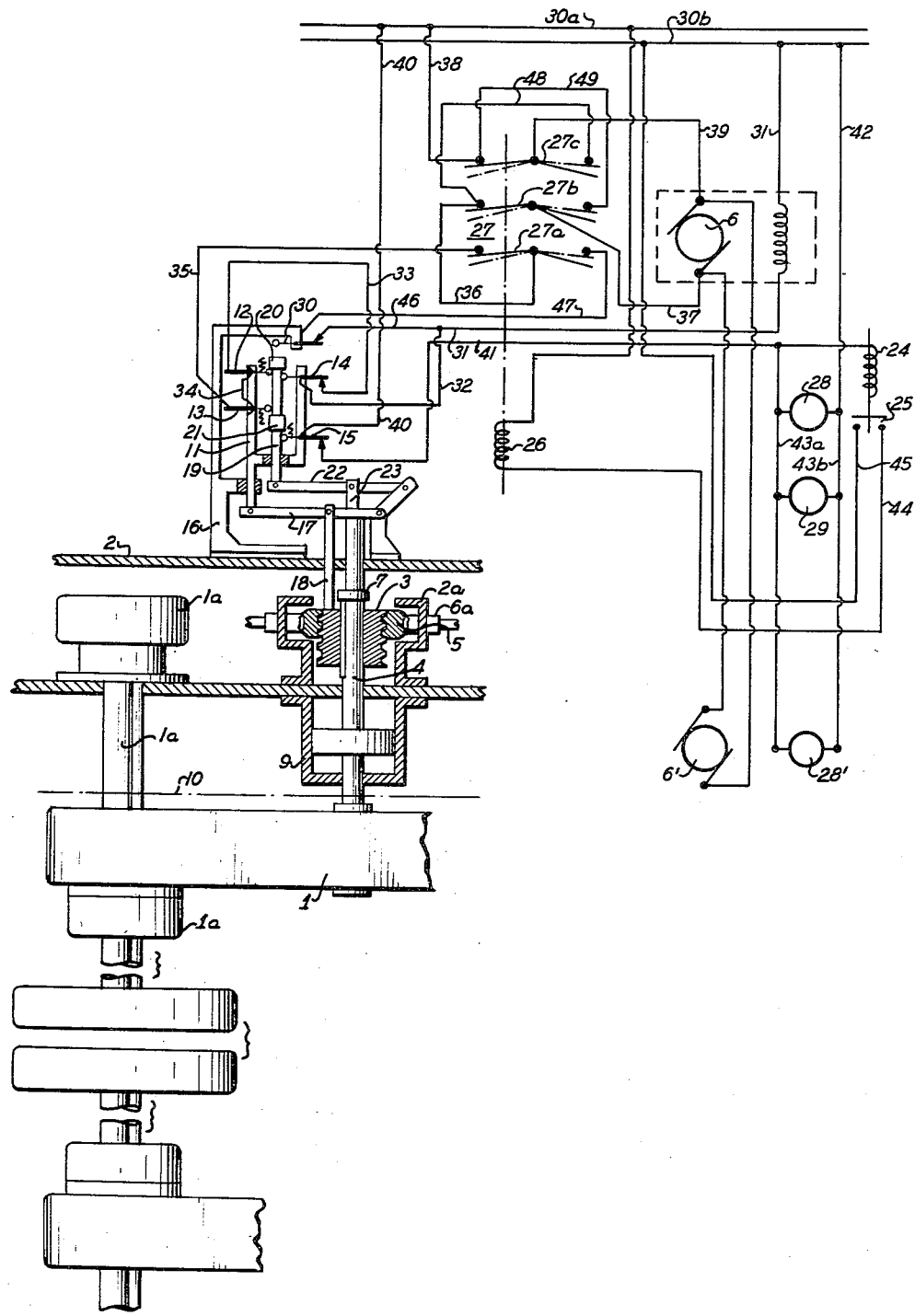

United States Patent Office

2,774,196

CONTROL OF THE TOOLS OF GLASS GRINDING AND/OR POLISHING MACHINES

Edmond Laverdisse, Auvelais, Belgium, assignor to Les Glaceries de la Sambre, Societe Anonyme, Auvelais, Belgium, a Belgian company Application May 19, 1954, Serial No. 430,914

Claims priority, application Belgium May 27, 1953

7 Claims. (Cl. 51—112)

The present invention concerns the simultaneous grinding and/or polishing of the two faces of a continuously moving sheet or ribbon of glass by means of opposite rotative tools applied under pressure to the two faces of the glass.

The applicant has already proposed to provide the tool holders with safety abutments comprising a screw and a nut which are actuated by a motor with a rearward movement in one direction for the purpose of withdrawing the tools from the sheet of glass and with an advancing movement in the other direction in order to permit the advance of the tool holders towards the glass sheet in proportion as the tools and the glass worked thereby become worn. In the direction of the advancing movement, these abutments are periodically actuated to allow the tool holders a certain clearance which is gradually taken up as a result of the advance of the tool holders moving in relation to the temporarily stationary abutments.

According to the present invention, the relative movement between the tool holder and the safety abutment thereof is utilised to control the actuation of this abutment. This permits on the one hand the automatic maintenance of the constancy of the working planes of the tools by means of the coaxial abutments of the tool holders, and on the other hand prevents the opposite tools, with the aid of the said abutments, from coming into contact in the event of breakage of the glass by which they are separated and thus avoids the serious damage that can result from such contact.

The slow relative movement which takes place between the tool holder and its safety abutment during the normal advance of the tool holder towards the intact glass sheet is utilised, in accordance with the invention, to control the advance of the abutment.

In the event of breakage and/or disappearance of the glass sheet the tool holder no longer encounters any resistance to its advance and the relative movement between the tool holder and its abutment becomes rapid. This rapid relative movement is utilised, in accordance with the invention, to control the retraction of the abutment and thus to cause the tool carrier to move backwardly before contact occurs between the opposed tools which are no longer held apart owing to the disappearance of the glass sheet.

In a preferred embodiment of the invention, the relative movement between a tool holder and its abutment which are situated on one side of the glass sheet is utilised to control simultaneously the actuation of this abutment and that of the abutment of the opposite tool holder situated on the other side of the glass sheet. Assuming that the wear on the tools working upon the opposed surfaces of the sheet is equal, which is substantially the case in practice, a simple means is thus afforded, by simultaneously imparting the same advance to the abutments of the opposite tools, of substantially maintaining constancy of the working planes of the tools on either side of the sheet, which thus undergoes no substantial bending force. In the case of the glass breaking, the two opposite tool holders are simultaneously drawn apart.

It will be appreciated that each tool holder can carry either a single tool or an assembly of tools, and that it may comprise either a single abutment or a number of synchronised abutments.

The accompanying drawing shows diagrammatically by way of example how the invention may be carried into practice.

In this drawing the numeral 1 designates the tool holder, which in this case is the cross member supporting the upper tools (not shown) from the upper beam 2 of a machine for simultaneously grinding and/or polishing the two faces of a moving glass sheet, and 3 designates the abutment coaxial with a suspension rod 4 of the tool holder, the said abutment comprising a screw keyed on the rod 4 and a nut 5 formed by a helically toothed wheel which is arranged to turn in the beam 2 without moving axially, when it is actuated by the electric motor 6 with the aid of a worm not shown. A ring 7 forming a counter-abutment is provided on the rod 4 of the tool holder and co-operates with the abutment 3. The rod 4 also supports a piston 8, the cylinder 9 of which is fixed to the beam 2 and under which oil under pressure is admitted through a pipe 10 to balance the weight of the tool holder 1 and to adjust the pressure of the tools on the glass sheet.

A fork 11 carrying four electric switches 12, 13, 14 and 15 is guided vertically in a bracket 16 fixed to the beam 2 and is connected by a lever 17 and a link 18 to the abutment 3. Slidably mounted in this fork 11 is a bar 19 comprising two bosses 20, 21, which is connected by a lever 22 and a link 23 to the rod 4 of the tool holder 1.

The switch 12 is normally open, while the switches 13, 14 and 15 are normally closed. Further, a contactor 27 including contacts 27a, 27b and 27c and controlled by a relay 26 is provided for determining the direction of rotation of the motor 6.

As seen in the drawing, the motor 6 is energized from supply lines 30a and 30b and, for this purpose, a line 31 extends from line 30b through the field winding of the motor 6 and is connected, by a line 32, to one contact of the normally closed switch 14. The other contact of switch 14 is connected, by a line 33, to one contact of the normally open switch 12, and the other contact of switch 12 is connected, by a line 34, to one contact of the normally closed switch 13. The other contact of switch 13 is connected, by a line 35 to the contact 27a of the contactor 27 which, when it is positioned as shown in the drawing, in turn connects the line 35 to a line 36 extending to the contact 27b. A line 36 extends from the contact 27b to one slip ring of the motor 6, while a line 39 extends from the other slip ring of motor 6 to the contact 27c which, in turn, is connected by a line 38 to the supply line 30a.

From the foregoing, it is apparent that the motor 6 is driven in the direction for moving the abutment 3 toward the glass sheet only when the switches 12, 13 and 14 are simultaneously closed with the contactor 27 in the illustrated position, which corresponds to the deenergized condition of the related relay or solenoid 26.

Further, as seen in the drawing, the solenoid 26 is interposed in a line 44 extending from supply line 30a to one side of the contacts 25 of a relay 24, while a line 45 extends from the other side of contacts 25 to the supply line 30b. When the coil of relay 24 is energized, the contacts 25 are separated, as in the drawing, while deenergizing or tripping of the relay 24 closes the contacts 25 of the latter to complete the circuit through solenoid 26 which then displaces the contactor 27 to a position of the latter for causing reverse rotation of the motor 6.

The circuit for energizing the coil of relay 24 includes a line 40 extending from the supply line 30a to the normally closed switch 15, a line 41 extending from the switch 15 to one side of the coil of relay 24, and a line 42 extending from the other side of the coil of relay 24 to the supply line 30b.

Further, the illustrated embodiment includes a motor 28 for rotating the upper tools in the usual manner, and a motor 29 for reciprocating or "balancing" the upper and lower beams, with the motors 28 and 29 being connected in parallel with the coil of relay 24, for example, by lines 43a and 43b, so that they are energized only when the switch 15 is in its normally closed position.

In order to control the reverse drive of the motor 6, a normally closed switch 30 extends into the path of the bar 19 and is opened by the boss 20 of the latter when the rod 4 has been raised a predetermined distance by the reverse rotation of motor 6. A line 46 extends from one side of switch 30 to the line 31, and a line 47 extends from the other side of switch 30 to the reverse side of contact 27a. The reverse circuit for the motor 6 is completed by a line 48 extending from the line 36 to the reverse side of contact 27c, and a line 49 extending from the line 38 to the reverse side of contact 27b.

When the solenoid 26 is energized, to displace the contacts of contactor 27 to the positions shown in broken lines, the completed circuit includes the line 31 extending from supply line 30b through the field winding to the line 46, the normally closed switch 30, the line 47 connected to the line 36 by the contact 27a, the line 48 which is connected to the line 39 by the contact 27c, the armature of the motor, the line 37 which is connected to the line 49 by the contact 27b, and finally the line 38 connected to the supply line 30a.

Assuming that the contacts of contactor 27 are initially in the full line positions of the drawing, as would be the case by reason of the energization of relay 24 through the normally closed switch 15, the contactor 27 will then be disposed to establish forward rotation of the motor 6 at any time when the switches 12, 13 and 14 are simultaneously closed.

The progressive wear on the tools and on the glass produces a slow downward movement of the tool holder 1, which is permitted by the clearance existing between the abutment 3 and the ring 7, and such clearance tends to be taken up by the relative movement between the tool holder and the abutment. The relative movement between the tool holder and the abutment is accompanied by a relative movement between the fork 11 and the bar 19, the boss 20 of which closes the switch 12 before the ring 7 touches the abutment 3, the closing of switch 12 starting the motor 6 in the direction for the downward movement of the abutment 3, in order to restore the clearance between the latter and the ring 7. The fork 11 descends with the abutment, and the switch 13 carried by fork 11 strikes against the boss 21 and is opened to stop the motor when the clearance is restored.

In the event of breakage and/or disappearance of the glass sheet, the tool holder 1 rapidly falls and carries with it the bar 19. In this rapid movement, the boss 20 closes the switch 12 as it travels past and immediately afterwards opens the switch 14, which interrupts the current to the motor 6 and thus prevents further downward movement of the abutment 3, while the boss 21 opens the switch 15, which trips or deenergizes the relay 24 and simultaneously stops the motors 28 and 29. The relay 24, when tripped establishes at 25 the feed to the relay 26, which actuates the contactor 27 so that the latter reverses the feed to the motor 6, whereby the abutment 3 is retracted and raises the tool holder 1 until the bar 19 opens the switch 30 thereby interrupting the current to the motor 6 and stopping the reverse rotation of the latter.

It is clear that the switches 12, 13, 14, 15, 30 may control, simultaneously with the control of the motors 6 and 28, associated with the upper tools, the corresponding motors of the opposed lower tools. Such corresponding motors have been shown and designated in the drawing by the reference numerals 6' and 28' and are connected in parallel to the feeding conductors of motors 6 and 28, respectively, motor 6' serving to drive a worm 6a' meshing with the worm wheel 5' which is mounted in the support 2a', fixed to the lower beam 2', and which controls the safety abutment nut 3', the latter cooperating with a safety abutment 7' on the rod 4'. The rod 4' is suspended within the lower beam 2' by means of a piston 8' working in an oil pressure cylinder 9', and supports the holder 1' of the lower tools, of which only the shaft-portion 1a' is shown. Motor 29 serves to reciprocate, that is, to "balance", the upper and lower beams 2 and 2' transversely with respect to the longitudinal direction of the glass sheet. Simultaneous operation of the two tool holders 1 and 1' is thus obtained, both during normal operation and in the event of breakage of the glass.

Naturally, the invention is not limited to the embodiment described and illustrated by way of example and modifications may be made therein without departing from the scope of the invention.

I claim:

1. In a machine for simultaneously grinding or polishing both faces of a glass sheet; the combination of a support fixed in relation to its distance from the glass sheet, at least one tool holder, means mounting said tool holder on said support for movement relative to the latter in first and second directions respectively toward and away from the glass sheet, safety stop means carried by said support and movable relative to the latter in said first and second directions, an abutment connected to said tool holder to move with the latter and engageable with said stop means so that the latter adjustably limits the movement of said tool holder in said first direction relative to said support, motor means operatively connected to said safety stop means and capable of forward and reverse operation to move said stop means in said first and second directions, respectively, relative to said support, control means for said motor means operating in response to the relative movement and positioning of said abutment with respect to said safety stop means and including means normally operative in response to the slow movement of said abutment in said first direction toward said stop means to cause forward operation of said motor thereby to move said stop means in said first direction away from said abutment, means halting the forward operation of said motor means in response to the attainment of a predetermined clearance between said stop means and abutment and means operative in response to the rapid movement of said abutment in said first direction toward said stop means to interrupt the forward operation of said motor means and to cause reverse operation of the latter thereby to move said safety stop means in said second direction against said abutment for also moving said tool holder in said second direction relative to said support, and means halting the reverse operation of said motor means in response to the movement of said abutment and tool holder in said second direction to predetermined positions relative to said support.

2. In a machine for simultaneously grinding or polishing both faces of a glass sheet; the combination of a support fixed in relation to its distance from a glass sheet, at least one tool holder, means mounting said tool holder on said support for movement relative to the latter in first and second directions respectively toward and away from the glass sheet, safety stop means carried by said support and movable relative to the latter in said first and second directions, an abutment connected to said tool holder to move with the latter and engageable with said stop means so that the latter adjustably limits the movement of said tool holder in said first direction relative to said support, motor means operatively connected to said safety stop means and capable of forward and reverse operation to move said stop means in said first and second directions, respectively, relative to said support electrical means for reversing said motor means, a switch carrying member connected to said safety stop means for movement with the latter relative to said support, a switch controlling member connected to said abutment for movement with the latter relative to said support and said switch carrying member, and electrical circuits for said motor means and said motor reversing means including switch means mounted on said switch carrying member and actuated by said switch controlling member to intermittently effect forward operation of said motor means in response to the relative movements of said switch carrying and controlling members resulting from the slow movement of said abutment in said first direction toward said safety stop means, thereby normally maintaining a predetermined clearance between said abutment and stop means, and to interrupt the forward operation of the motor means and operate said motor reversing means in response to the relative movements of said switch carrying and controlling members resulting from the rapid movement of said abutment in said first direction toward said safety stop means whereby said motor means then moves said stop means in said second direction against said abutment to correspondingly move said tool holder relative to said support, and additional switch means fixed relative to said support and actuated by said switch controlling member to halt the reverse operation of said motor means when said tool holder moves in said second direction to a predetermined position relative to said support.

3. In a machine for simultaneously grinding or polishing both faces of a glass sheet; the combination of a support fixed in relation to its distance from the glass sheet, at least one tool holder, means mounting said tool holder on said support for movement relative to the latter in first and second directions respectively toward and away from the glass sheet, safety stop means carried by said support and movable relative to the latter in said first and second directions, an abutment connected to said tool holder to move with the later and engageable with said stop means so that the latter adjustably limits the movement of said tool holder in said first direction relative to said support, motor means operatively connected to said safety stop means and capable of forward and reverse operation to move said stop means in said first and second directions, respectively, relative to said support, electrical means for reversing said motor means, a switch carrying member connected to said safety stop means for movement with the latter relative to said support, a switch controlling member connected to said abutment for movement with the latter relative to said support and said switch carrying member, an electric circuit for causing forward operation of said motor means including a first normally open switch and second and third normally closed switches connected in series so that forward operation of said motor means occurs only when said first, second and third switches are simultaneously closed, said first, second and third switches being mounted on said switch carrying member, said switch controlling member having bosses thereon, one of said bosses engaging said first switch and closing the latter in response to slow movement of said abutment in said first direction toward said safety stop means thereby to cause forward operation of said motor means, another of said bosses engaging and opening said second switch after said forward operation of the motor means has moved said safety stop means in said first direction to an extent sufficient to reestablish a normal clearance between said abutment and safety stop means, said one boss engaging and opening said third switch to interrupt the forward operation of said motor means in response to the rapid movement of said abutment toward said safety stop means at a speed greater than that at which forward operation of said motor means can move said safety stop means away from said abutment, an electrical circuit for operating said motor reversing means including a fourth normally closed switch mounted on said switch carrying member and opened by said other boss on the switch controlling member in response to said rapid movement of said abutment toward said safety stop means to then reverse the operation of said motor means for moving said safety stop means in said second direction against said abutment to cause corresponding movement of said tool holder relative to said support, and a fifth switch fixed relative to said support and interposed in said electrical circuit for operating said motor reversing means, said fifth switch being normally closed and disposed to be opened by said one boss, thereby to halt the reverse operation of said motor means, when said tool holder has moved in said second direction to a predetermined position relative to said support.

4. In a machine for simultaneously grinding or polishing both faces of a glass sheet; the combination as in claim 3, further comprising second motor means for driving tools carried by said tool holder, and electrical circuit means for energizing said second motor means and having said fourth normally closed switch interposed therein so that the drive of the tools is interrupted when said fourth switch is opened in response to said rapid movement of said abutment in said first direction toward said safety stop means.

5. In a machine for simultaneously grinding or polishing both faces of a glass sheet and having tool holders which are movable toward and away from each other at the opposite sides of the glass sheet; the combination of a beam for each tool holder fixed in relation to its distance from the glass sheet, means movably supporting each tool holder from the related beam for movement relative to the latter in first and second directions respectively toward and away from the glass sheet, safety stop means carried by said beam and movable relative to the latter in said first and second directions, an abutment connected to said supporting means to move with the related tool holder relative to said beam and engageable with said safety stop means so that the latter adjustably limits the movement of said tool holder in said first direction relative to said beam, a first reversible electric motor operatively connected to said safety stop means and capable of forward and reverse operations for moving said stop means in said first and second directions respectively, relative to said beam, a switch carrying member connected to said safety stop means of one of said tool holders for movement with the associated stop means relative to the corresponding beam, a switch controlling member connected to said abutment associated with said one tool holder and movable with the latter relative to the corresponding beam and said switch carrying member, electrical means for reversing said first motor, a second motor for driving tools carried by said tool holders, a third motor for effecting the reciprocation of said beams relative to each other, and electrical circuits for said motors and said reversing means including switch means mounted on said switch carrying member and actuated by said switch controlling member in response to relative movement of said switch carrying and controlling members, said switch means being operative to cause forward operation of said first motor when said abutment of said one tool holder moves slowly in said first direction toward the related safety stop means thereby to move the latter in said first direction, to halt the forward operation of said first motor when a predetermined clearance has been reestablished between said abutment and stop means of said one tool holder, to halt the forward operation of said first motor and operate said reversing means and to halt the operation of said second and third motors in response to rapid movement of said abutment of said one tool holder toward the related stop means in said first direction at a speed greater than that at which forward operation of said first motor can move said stop means in said first direction, thereby halting the driving of tools in said tool holders and the reciprocation of the beams and simultaneously causing reverse operation of said first motor for moving said stop means in said second direction against said abutment to cause corresponding movement of each tool holder in said second direction relative to the related beam, and additional switch means fixed relative to the beam associated with said one tool holder and actuated by said switch controlling member to halt the reverse operation of said first motor in response to the movement of said abutment of said one tool holder in said second direction to a predetermined position relative to the corresponding beam.

6. In a machine for simultaneously grinding or polishing both faces of a glass sheet and having tool holders which are movable toward and away from each other at opposite sides of the glass sheet; the combination according to claim 5, wherein the first mentioned switch means includes a first normally open switch and second, third and fourth normally closed switches spaced apart on said switch carrying member along the path of relative movement of said switch controlling member, said first, second and third switches being connected in series in the electric circuit for energizing said first motor during the forward operation of the latter so that said forward operation occurs only when said first, second and third switches are simultaneously closed, said switch controlling member having first and second bosses thereon, said first boss engaging said first switch and closing the latter in response to said slow movement of the abutment relative to the safety stop means, said second boss engaging said second switch and opening the latter when said predetermined clearance between said abutment and stop means has been reestablished, said first boss further engaging and opening said third switch in response to said rapid movement of the abutment toward the safety stop means, said fourth normally closed switch being interposed in the electrical circuit of said motor reversing means and in the energizing circuits of said second and third motors and being engaged and opened by said second boss in response to said rapid movement to cause actuation of said motor reversing means and to halt operation of said second and third motors.

7. In a machine for simultaneously grinding or polishing both faces of a glass sheet and having tool holders which are movable toward and away from each other at opposite sides of the glass sheet; the combination as in claim 6, wherein said additional switch means includes a fifth normally closed switch interposed in the electrical circuit for energizing said first motor during reverse operation of the latter and arranged on said beam to be opened by said first boss when said one tool holder reaches said predetermined position relative to the associated beam after movement in said second direction.

References Cited in the file of this patent

UNITED STATES PATENTS

| | | |
|---|---|---|
| 2,304,974 | Waldron | Dec. 15, 1942 |
| 2,308,976 | Indge | Jan. 19, 1943 |
| 2,348,581 | Waldron | May 8, 1944 |
| 2,590,717 | Lowe | Mar. 25, 1952 |
| 2,673,424 | Laverdisse | Mar. 30, 1954 |